(12) United States Patent
Oikawa et al.

(10) Patent No.: US 11,654,954 B2
(45) Date of Patent: May 23, 2023

(54) STEERING DEVICE

(71) Applicant: AISIN CORPORATION, Aichi (JP)

(72) Inventors: Tatsuya Oikawa, Kariya (JP); Toshihiro Muraki, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/693,499

(22) Filed: Mar. 14, 2022

(65) Prior Publication Data

US 2022/0297740 A1 Sep. 22, 2022

(30) Foreign Application Priority Data

Mar. 19, 2021 (JP) .............................. JP2021-045737
Feb. 14, 2022 (JP) .............................. JP2022-020166

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ........ B62D 1/184; B62D 1/187; B62D 1/189; B62D 1/16
See application file for complete search history.

(56) References Cited

U.S. PATENT DOCUMENTS

| | | | |
|---|---|---|---|
| 3,491,614 A * | 1/1970 | Demske ................. | B62D 1/192 403/325 |
| 5,009,120 A * | 4/1991 | Iseler .................... | B62D 1/185 280/775 |
| 5,562,306 A | 10/1996 | Rispeter | |
| 7,178,422 B2 * | 2/2007 | Armstrong ............. | B62D 1/184 280/775 |
| 2005/0284251 A1 | 12/2005 | Inayoshi et al. | |
| 2017/0129529 A1 * | 5/2017 | Martinez ................ | B62D 1/189 |

FOREIGN PATENT DOCUMENTS

| | | |
|---|---|---|
| JP | 2006007956 A | 1/2006 |
| JP | 2013-028298 A | 2/2013 |

OTHER PUBLICATIONS

The extended European Search Report dated Aug. 11, 2022, by the European Patent Office in corresponding European Patent Application No. 22162043.8-1009. (7 pages).

* cited by examiner

*Primary Examiner* — Drew J Brown
(74) *Attorney, Agent, or Firm* — Buchanan Ingersoll & Rooney PC

(57) ABSTRACT

A steering device includes a column housing encapsulating a steering shaft and enabling a posture change, a bracket located adjacent to the column housing, and a tensioner mechanism being between the column housing and the bracket, and pressing the column housing and the bracket. The tensioner mechanism includes a casing provided in the column housing or the bracket, a tensioner main body being provided in the casing, and being movable in a direction intersecting a facing direction of the column housing and the bracket, and a biasing member biasing the tensioner main body. The tensioner main body includes a first surface facing toward the column housing, and a second surface facing toward the bracket. The first surface and the second surface are configured to be in a tapered shape in which a space therebetween becomes narrower as closer to a lower side of a biasing direction.

5 Claims, 4 Drawing Sheets

STEERING DEVICE

CROSS REFERENCE TO RELATED APPLICATIONS

This application is based on and claims priority under 35 U.S.C. § 119 to Japanese Patent Application 2021-045737, filed on Mar. 19, 2021, and Japanese Patent Application 2022-020166, filed on Feb. 14, 2022, the entire content of which is incorporated herein by reference.

TECHNICAL FIELD

This disclosure generally relates to a steering device including a column housing that encapsulates a steering shaft related to steering of a vehicle, is supported by a pivotal support portion of the vehicle, and is capable of a posture change, and a bracket that is located adjacent to the column housing at a position different from that of the pivotal support portion on the vehicle side, and being provided with a tensioner mechanism that causes press force to act between the column housing and the bracket.

BACKGROUND DISCUSSION

As such a steering device, there has conventionally been a steering device disclosed in, for example, JP2006-7956A (Reference 1) (see paragraphs [0011] and [0016] and FIGS. 2, 5, and 6).

In the conventional steering device, a steering column is pivotally supported by a main bracket fixed on a vehicle side, and a pressurization member as a tensioner mechanism is provided between the main bracket and the steering column. The pressurization member is constituted of a leaf spring or a coil spring, and pressure is applied to the steering column from the main bracket by the pressurization member in one direction. This heightens rigidity of the steering column in a left-right direction, and suppresses vibration to be transmitted to a steering wheel.

The conventional steering device described above ensures rigidity of the steering column by use of a press load by a spring. Thus, the steering column is brought into a state of floating relative to the main bracket due to the spring. Accordingly, some vibration is always produced in the steering column that has been affected by vibration of a vehicle, and a sense of rigidity becomes insufficient as an operating feel of steering. Application of vibration for a long period of time also causes a fear that the pressurization member may break by fatigue.

Moreover, when a steering device is mounted to a vehicle, it is necessary to insert a steering column into a main bracket while compressing a pressurization member, and mounting work becomes extremely complicated. On the other hand, a spring load of the pressurization member has to be limited in order to improve mountability, which leads to deterioration of holding rigidity of the steering column.

A need thus exists for a steering device which is not susceptible to the drawback mentioned above.

SUMMARY

A steering device according to this disclosure includes a column housing, a bracket, and a tensioner mechanism. The column housing encapsulates a steering shaft related to steering of a vehicle, is supported by a pivotal support portion of the vehicle, and is capable of a posture change. The bracket is located adjacent to the column housing at a position different from that of the pivotal support portion on a side of the vehicle. The tensioner mechanism is provided between the column housing and the bracket, and produces press force against the column housing and the bracket. The tensioner mechanism includes a casing, a tensioner main body, and a biasing member. The casing is provided in the column housing or the bracket. The tensioner main body is provided in the casing, and is movable in a direction intersecting a facing direction of the column housing and the bracket. The biasing member biases the tensioner main body in the intersecting direction. The tensioner main body includes a first surface facing toward the column housing, and a second surface facing toward the bracket. The first surface and the second surface are configured to be in a tapered shape in which a space therebetween is narrower as being positioned closer to a lower side of a biasing direction by the biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION (Outline)

A steering device S according to this disclosure relates to a steering device including a column housing C encapsulating a steering shaft related to steering of a vehicle, being supported by a pivotal support portion of the vehicle, and being capable of a posture change, and a bracket B being located adjacent to the column housing C at a position different from that of the pivotal support portion on a vehicle side. The steering device S is provided with a tensioner mechanism T that causes press force to act between the column housing C and the bracket B. Hereinafter, each embodiment regarding the steering device S according to this disclosure is described with reference to each figure.

First Embodiment

Figure 1:
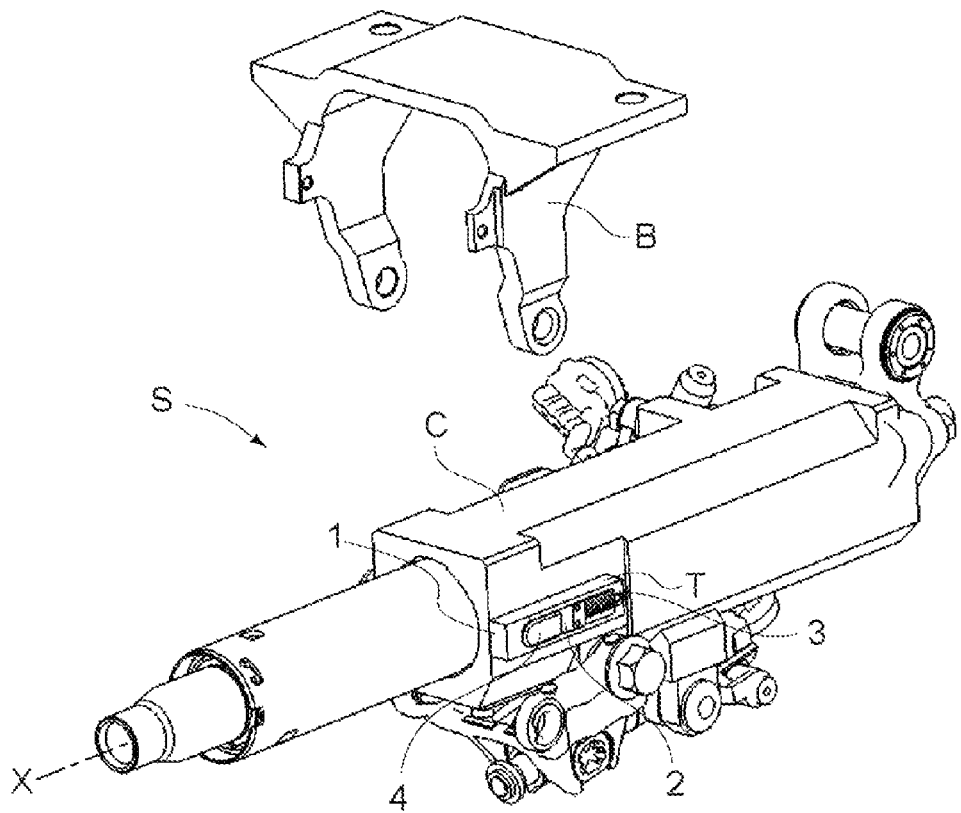
FIG. 1 is an exploded perspective view illustrating a configuration of a steering device according to a first embodiment.
Figure 2:
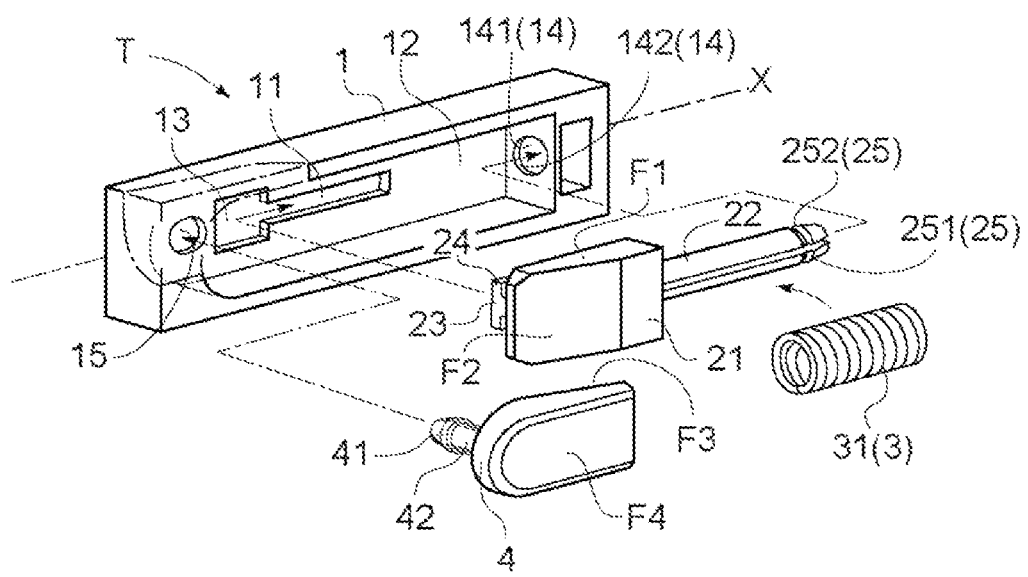
FIG. 2 is an exploded perspective view illustrating an essential part of a tensioner mechanism according to the first embodiment.

FIGS. 1 to 3 illustrate an example of a steering device S according to a first embodiment of this disclosure. A tensioner mechanism T of this device prevents movement of a column housing C by use of a bracket B in such a way that the column housing C does not inadvertently move relative to a vehicle, while allowing a tilt operation of the column housing C. The tensioner mechanism T of this configuration certainly suppresses movement of the column housing C during use of a vehicle, exerts satisfactory workability at attachment to the vehicle, and has the following configuration.

As illustrated in FIGS. 1 to 3, the tensioner mechanism T is provided over the column housing C and the bracket B. As major components, the tensioner mechanism T includes a casing 1, a tensioner main body 2 being provided in the casing 1, and being movable in a direction intersecting a facing direction of the column housing C and the bracket B, and a biasing member 3 that biases the tensioner main body 2 in the intersecting direction.

Among the components, the tensioner main body 2 includes a first surface F1 facing toward the column housing C, and a second surface F2 facing toward the bracket B, and the first surface F1 and the second surface F2 are configured to be nonparallel. That is to say, the first surface F1 and the second surface F2 are configured to be in a tapered shape in which a space therebetween becomes narrower as positioned closer to a lower side of a biasing direction by the biasing member 3. This configuration can press the column housing C and the bracket B against each other by a wedge effect, by biasing the tensioner main body 2 as described later.

[Tensioner Mechanism]

A more detailed configuration of the tensioner mechanism T is illustrated below. As illustrated in FIGS. 2 and 3, the tensioner mechanism T herein is constituted of the casing 1, the tensioner main body 2 attached to the casing 1, the biasing member 3 that biases the tensioner main body 2, and an intermediate member 4 that abuts on the tensioner main body 2. The casing 1 is provided in the column housing C, but may be provided in the bracket B.

The casing 1 is a long member, and is integrally formed by aluminum die-casting in the column housing C in this embodiment. Naturally, a casing configured separately from the column housing C may be attached to the column housing C by a screw or the like. A groove portion 11 that slidably holds the tensioner main body 2 is formed in a center of the casing 1.

The tensioner main body 2 includes, for example, a head portion 21 and a rod-shaped portion 22. The head portion 21 is a part that presses the column housing C and the bracket B in directions away from each other, and includes the first surface F1 that abuts on a long receiving surface 12 formed across the groove portion 11 of the casing 1, and the second surface F2 that abuts on a member on a side of the bracket B. Herein, the first surface F1 is parallel to an axial center X of the column housing C, and the second surface F2 is tilted relative to the axial center X.

A leg portion 23 protruding in a direction orthogonal to the biasing direction, i.e., a direction facing toward the casing 1 is formed from a central position of the first surface F1 of the head portion 21 of the tensioner main body 2. Moreover, a flange portion 24 is formed at a tip of the leg portion 23. A part of the leg portion 23 and the flange portion 24 are inserted into the groove portion 11 of the casing 1, and a part of the flange portion 24 abuts on a back surface of the groove portion 11. Thereby, the leg portion 23 and the flange portion 24 are held inside the groove portion 11.

Note that a wide portion 13 into which the flange portion 24 is insertable is provided in a part of the groove portion 11. The wide portion 13 is used only when the tensioner main body 2 is fitted to the casing 1, and the leg portion 23 and the flange portion 24 do not come to a position of the wide portion 13 when the tensioner main body 2 is in a running state.

This configuration can prevent the tensioner main body 2 from dropping out of the casing 1, when the tensioner main body 2 is attached to the casing 1, or when the column housing C to which the tensioner main body 2 is attached is placed in the bracket B. Moreover, since a movement track of the tensioner main body 2 is stabilized by the leg portion 23 and the groove portion 11, a press function by the tensioner main body 2 is certainly exerted.

The rod-shaped portion 22 extends from the head portion 21 of the tensioner main body 2 in a direction along the axial center X. For example, the biasing member 3 configured by a coil spring 31 is externally inserted to the rod-shaped portion 22. That is to say, an extending direction of the rod-shaped portion 22 is also the biasing direction of the biasing member 3. A lock portion 25 is provided at a tip of the rod-shaped portion 22. The lock portion 25 is specifically a claw portion 251, and the claw portion 251 is elastically deformable in a direction orthogonal to the biasing direction. As illustrated in FIG. 2, the tip of the rod-shaped portion 22 is formed into a fork shape having a pair of arm portions 252, and the claw portions 251 are each formed at a tip portion of each of the arm portions 252 in such a way as to face in directions opposite to each other.

A locked portion 14 to which the lock portion 25 is lockable is formed in the casing 1 on one side. Specifically, a bore portion 141 being capable of receiving the tip of the rod-shaped portion 22 is formed, and a concave portion 142 to which the claw portion 251 is lockable is formed in an inner surface of the bore portion 141. In this embodiment, the concave portion 142 is an edge portion of the bore portion 141.

Figure 3A:
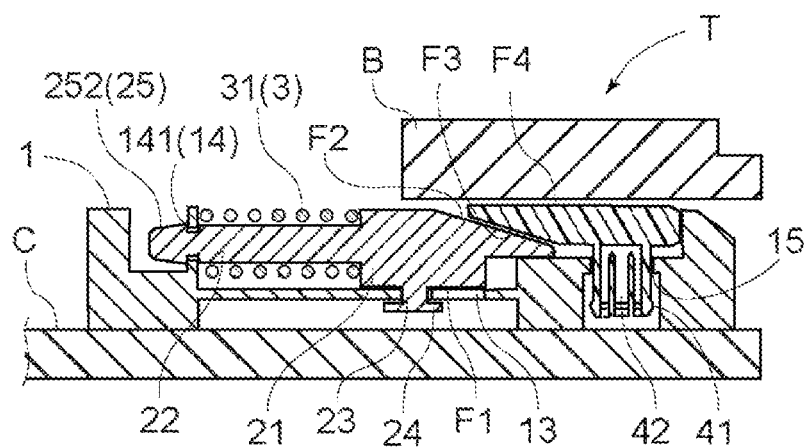
FIGS. 3A and 3B are sectional views illustrating an operation mode of the tensioner mechanism according to the first embodiment.

As illustrated in FIG. 3A, the lock portion 25 and the locked portion 14 according to this configuration can temporarily fix the tensioner main body 2 to the casing 1 in a state where the biasing member 3 is compressed by pressing the rod-shaped portion 22 of the tensioner main body 2 into the bore portion 141 of the casing 1. Thus, function retaining work of the tensioner mechanism T when placing the column housing C including the tensioner mechanism T in the bracket B becomes easy.

Figure 3B:
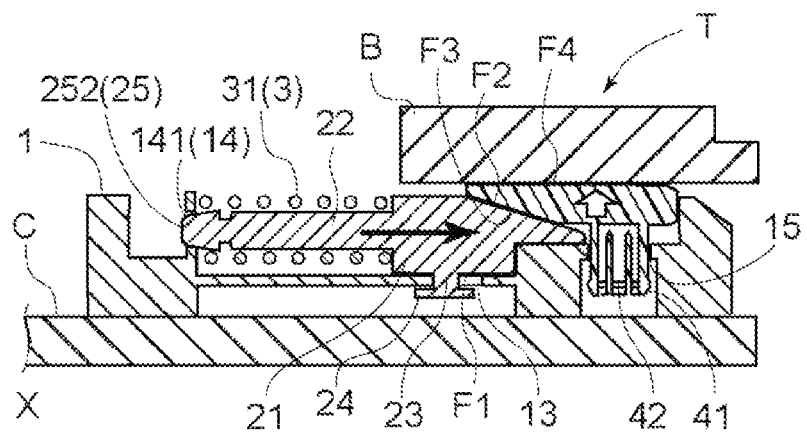

When the tensioner main body 2 is in a state of temporary fixing, the first surface F1 or the second surface F2 of the tensioner main body 2 does not act on a counterpart member such as the bracket B, and mounting work of the column housing C becomes easy. Thereafter, the lock portion 25 and the locked portion 14 are disengaged after mounting work of the column housing C is finished (FIG. 3B). In this case, a tool for work is brought into abutment with a pair of the arm portions 252 from an orthogonal direction, and the claw portion 251 is easily isolated from the concave portion 142 by reducing a space between a pair of the arm portions 252. By providing the lock portion 25 and the locked portion 14 according to this configuration in this way, placement work of the steering device S becomes easy, and the tensioner mechanism T that can certainly prevent vibration of the column housing C at normal running is reasonably configured.

[Intermediate Member]

As illustrated in FIG. 2, the tensioner mechanism T includes the intermediate member 4 that abuts on the head portion 21, in order to cause press force to act on the bracket B from the tensioner main body 2. The intermediate member 4 is also configured to be in a tapered shape, and includes a third face F3 that abuts on the second surface F2 of the head portion 21, and a fourth face F4 that abuts on the bracket B. In a state where the second surface F2 of the head portion 21 is in abutment with the third face F3 of the intermediate member 4, the first surface F1 and the fourth face F4 become parallel to each other.

With the intermediate member 4 as above, an arrangement position of the tensioner main body 2 becomes constant regardless of a gap dimension between the casing 1 and the bracket B by suitably setting a thickness of the intermediate member 4, and application of appropriate press force to the bracket B becomes easy. In this way, even when there is a manufacturing error in a gap dimension between the bracket B and the column housing C, a dimensional error can be absorbed, and the tensioner mechanism T can be caused to function appropriately.

Moreover, when the intermediate member 4 abuts on the bracket B, the fourth face F4 of the intermediate member 4 slides relative to the bracket B at a tilt operation of the column housing C. Thus, durability of the tensioner mechanism T such as wear of the bracket B is feared. However, wear damage of the bracket B or the like can be prevented by suitably setting a material of the intermediate member 4 and an abutting area on the bracket B, and the steering device S having high durability can be acquired.

The intermediate member 4 is provided with a bulging portion 41 for easing attachment to the casing 1. As illustrated in FIG. 2, the bulging portion 41 is provided at a tip of a coming-off stopper portion 42 protrusively formed from a part of the intermediate member 4 toward the casing 1, and configured to be in an elastically opening and deformable hook shape. On the other hand, the casing 1 is provided with a fixing bore 15 into which the bulging portion 41 and the coming-off stopper portion 42 are engageable with slight elastic deformation.

Note that in a state where the coming-off stopper portion 42 is engaged in the fixing bore 15, the intermediate member 4 does not drop out of the casing 1, but is movable a predetermined distance along a direction from the casing 1 toward the bracket B.

With this configuration, the intermediate member 4 does not inadvertently drop, for example, when the column housing C to which the tensioner mechanism T is attached is mounted to the bracket B, and mounting work of the column housing C becomes easy. Moreover, because of the configuration in which the elastically deformable coming-off stopper portion 42 is engaged in the fixing bore 15, mounting work of the intermediate member 4 to the casing 1 is also extremely easy.

With the tensioner mechanism T according to this configuration, the head portion 21 is pressed in a direction of the axial center X by the biasing member 3, and the intermediate member 4 can be pressed against the bracket B by utilizing a wedge effect. Thus, great biasing force of the biasing member 3 does not need to be set, the compact biasing member 3 can be used, and the tensioner mechanism T becomes space-saving. In a state where the intermediate member 4 is pressed against the bracket B, the head portion 21 and the intermediate member 4 are brought into a state of closely abutting between the casing 1 and the bracket B. Thus, the column housing C has no room to move relative to the bracket B, and results in being firmly positioned and held.

Second Embodiment

Figure 4:
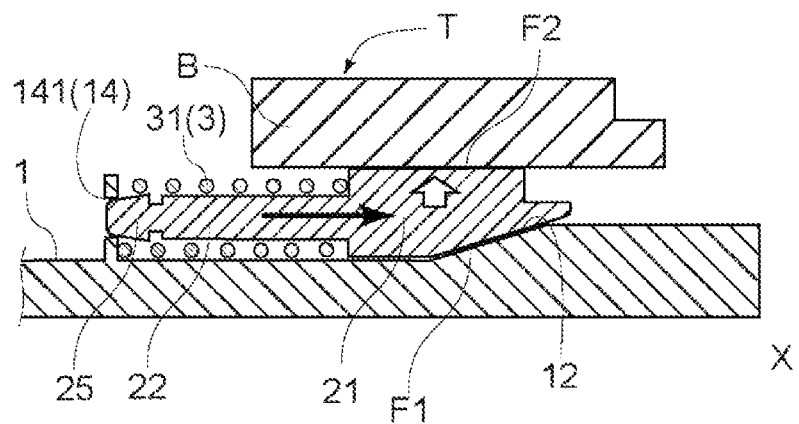
FIG. 4 is a sectional view illustrating a configuration of a tensioner mechanism according to a second embodiment.

FIG. 4 illustrates an example in which an intermediate member 4 is omitted and a tensioner mechanism T is simplified. In this configuration, a first surface F1 of a head portion 21 and a receiving surface 12 of a casing 1 are inclined surfaces, and a second surface F2 on a side of the bracket B is a flat surface parallel to an axial center X. In this case, no particular processing needs to be applied to the bracket B being utilizable as a common member for various steering devices S, a press function can be exerted by only the tensioner mechanism T, and application to the various steering devices S becomes easy.

Note that in this case as well, the intermediate member 4 can be provided between the head portion 21 and a column housing C or between the head portion 21 and the bracket B, in order to absorb a variation of a gap dimension between the column housing C and the bracket B. In this case, for example, a shim member having a simple flat shape may be mounted to any facing member.

Third Embodiment

Figure 5:
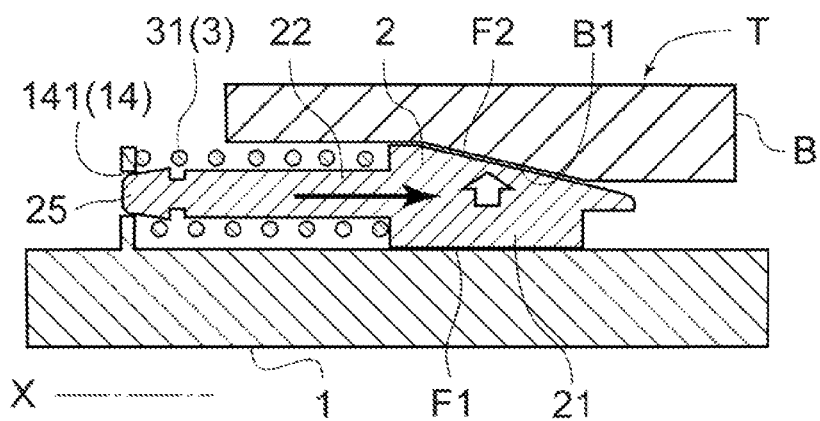
FIG. 5 is a sectional view illustrating a configuration of a tensioner mechanism according to a third embodiment.

FIG. 5 also omits an intermediate member 4 as in the example of FIG. 4. However, in a configuration of a head portion 21, a second surface F2 facing a bracket B is a tilted face, as in the first embodiment.

In this case, a tilted face B1 needs to be formed in the bracket B as well. However, since the head portion 21 moves along an axial center X and is not displaced in a direction intersecting the axial center X, a press function of the head portion 21 becomes stable.

Note that in this configuration as well, a shim member having a flat shape can be attached to the head portion 21 or the bracket B. Thereby, a gap between the head portion 21 and the bracket B is filled, and a function exertion position of the head portion 21 along the axial center X can be adjusted to an appropriate position.

Fourth Embodiment

Figure 6A:
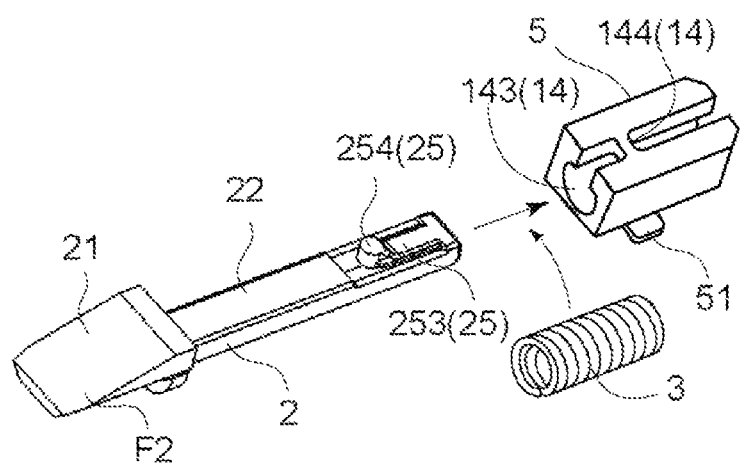
FIGS. 6A and 6B are exploded perspective views illustrating a configuration of a tensioner mechanism according to a fourth embodiment.

FIGS. 6A and B illustrate an example in which a tensioner main body 2 and the like are temporarily assembled in a state where a biasing member 3 is previously compressed, and the temporal assembly is attached to a casing 1.

In this configuration as well, the tensioner main body 2 includes a head portion 21 and a rod-shaped portion 22. However, a shape of a lock portion 25 at a tip is different. Namely, the lock portion 25 includes one arm portion 253 extending along an axial center X at a tip of the rod-shaped portion 22, and a claw portion 254 is formed at a tip of the arm portion 253. The claw portion 254 is swingable in a direction intersecting the axial center X.

In this embodiment, a locked portion 14 on one side is configured apart from the casing 1. Namely, the locked portion 14 is provided in a block-shaped receiving member 5, and constituted of a bore portion 143 into which the rod-shaped portion 22 is insertable, and a concave portion 144 to which the claw portion 254 inserted through the bore portion 143 is locked. The concave portion 144 is a cutout penetrating and formed in a wall portion of the receiving member 5 along a diametrical direction relative to the axial center X.

Figure 6B:
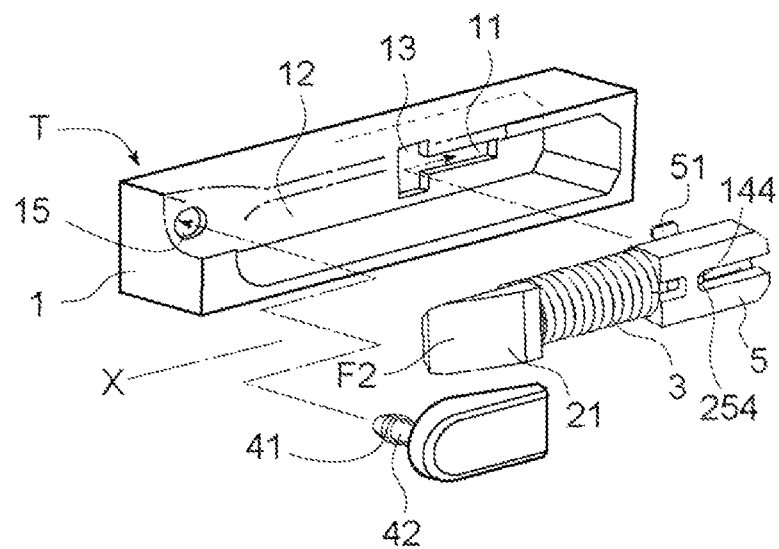

As illustrated in FIG. 6B, when the tensioner main body 2 or the like is attached to the casing 1, the biasing member 3 is inserted through the rod-shaped portion 22, and the rod-shaped portion 22 is inserted into the bore portion 143 of the receiving member 5. By contracting and pressing in the biasing member 3 at the same time, the claw portion 254 is locked to the concave portion 144, and the tensioner main body 2 and a locked portion 14 are integrated in a state where the biasing member 3 is compressed.

As illustrated in FIG. 6, a projecting portion 51 is formed on a back surface of the receiving member 5, and is configured to be inserted through from a wide portion 13 of a groove portion 11 and lockable to a back surface of a groove portion 11. Thereby, the tensioner main body 2 in a state where the biasing member 3 is compressed is attached to the casing 1. Mounting to the receiving member 5 can be performed in a state where the tensioner main body 2 is compressed in this way and in a state being away from the casing 1, and thereby the mounting work becomes extremely easy.

After the tensioner main body 2 is fixed to the casing 1, the column housing C is fixed to a predetermined position relative to the bracket B, and the claw portion 254 is unlocked. In this instance, a locked state is released with ease by only pressing the claw portion 254 to a side of the axial center X. In this way, by including a tensioner mechanism T according to this configuration, a steering device S in which mounting work is extremely easy can be acquired.

A steering device according to this disclosure includes a column housing, a bracket, and a tensioner mechanism. The column housing encapsulates a steering shaft related to steering of a vehicle, is supported by a pivotal support portion of the vehicle, and is capable of a posture change. The bracket is located adjacent to the column housing at a position different from that of the pivotal support portion on a side of the vehicle. The tensioner mechanism is provided between the column housing and the bracket, and produces press force against the column housing and the bracket. The tensioner mechanism includes a casing, a tensioner main body, and a biasing member. The casing is provided in the column housing or the bracket. The tensioner main body is provided in the casing, and is movable in a direction intersecting a facing direction of the column housing and the bracket. The biasing member biases the tensioner main body in the intersecting direction. The tensioner main body includes a first surface facing toward the column housing, and a second surface facing toward the bracket. The first surface and the second surface are configured to be in a tapered shape in which a space therebetween is narrower as being positioned closer to a lower side of a biasing direction by the biasing member.

In the tensioner mechanism of this configuration, the first surface and the second surface being provided in the tensioner main body in such a way as to be in a tapered shape relative to each other always abut on the column housing or the bracket, and the casing. Thus, the column housing and the bracket are not elastically and relatively displaced. Consequently, holding rigidity of the column housing becomes very high.

Moreover, since relative positions of the column housing and the bracket are defined by utilizing a wedge effect of the first surface and the second surface in a tapered shape, a biasing member that biases the tensioner main body in a direction of an axial center can be small. Thus, the tensioner mechanism becomes compact, and a steering device being high in equipping performance can be acquired.

In the steering device according to this disclosure, the casing may include an intermediate member being pressed in the opposite direction by abutment with the first surface or the second surface, and abutting on the bracket or the column housing on a side where the casing is not provided.

By providing such an intermediate member in the casing, and altering a push-out amount of the intermediate member from the casing as in this configuration, a thickness of the tensioner mechanism itself can be changed. Thus, even when there is a manufacturing error or the like in a gap dimension between the bracket and the column housing, a dimensional error can be absorbed by a position adjustment of the intermediate member.

Moreover, in a configuration in which the intermediate member abuts on the bracket or the column housing, the intermediate member slides relative to the bracket or the like at a tilt operation of the column housing. Thus, durability of the bracket and the column housing dependent on wear is feared. However, the intermediate member can be formed into a relatively simple configuration, and wear damage of the bracket or the like can be prevented by suitably setting a material of the intermediate member. Thus, a steering device having high durability can be acquired.

In the steering device according to this disclosure, the intermediate member may be provided with a coming-off stopper portion including a bulging portion at a tip and having an elastically deformable convex shape. The casing may be provided with a fixing bore into which the coming-off stopper portion is engaged.

With a configuration in which a coming-off stopper portion having an elastically deformable convex shape is engaged into a fixing bore as in this configuration, mounting work of the intermediate member to the casing becomes easy.

Moreover, with this configuration being capable of temporarily fastening the intermediate member to the casing, the intermediate member does not inadvertently drop, for example, when the column housing to which the tensioner mechanism is attached is placed at a predetermined position of the bracket, and mounting work of the column housing becomes extremely easy.

In the steering device according to this disclosure, a lock portion and a locked portion that engage with each other in a state where the tensioner main body is moved in a direction opposite to the biasing direction may be allocated to and formed in the tensioner main body and the casing.

By providing the lock portion and the locked portion of this configuration, function exertion of the tensioner main body can be reserved, for example. when the column housing encapsulating the tensioner mechanism is placed at a predetermined position relative to the bracket. In other words, the first surface or the second surface of the tensioner main body does not act on a counterpart member such as the bracket at mounting work, and mounting work of the column housing becomes easy. Thereafter, the tensioner mechanism can be caused to function by unlocking the lock portion and the locked portion after mounting work of the column housing is finished, and placement work of the steering device can be speeded up.

In the steering device according to this disclosure, the tensioner main body may include a rod-shaped portion extending in the biasing direction, the lock portion may be a claw portion provided at a tip of the rod-shaped portion in a state of being elastically deformable in a direction orthogonal to the biasing direction, and the locked portion may be a bore portion being provided in the casing, including a concave portion to which the claw portion is lockable, and being capable of receiving a tip of the rod-shaped portion.

By providing the lock portion and the locked portion of this configuration, the tensioner main body can be positioned and fixed with ease by pressing the rod-shaped portion of the tensioner main body into the bore portion of the casing. Thus, presence of the tensioner mechanism does not become an obstacle, and mounting work of the column housing becomes smooth.

Moreover, by providing the rod-shaped portion in the tensioner main body, for example, the biasing member can be a coil spring and then be externally inserted to the rod-shaped portion. Thus, the tensioner mechanism having both a holding function of the biasing member and a locking function of the tensioner main body can be reasonably configured.

The steering device according to this disclosure may have a configuration in which a leg portion protruding in a direction orthogonal to the biasing direction, and a flange portion provided at a tip of the leg portion are formed in the tensioner main body, and the casing is provided with a groove portion that guides movements of the leg portion and the flange portion in such a way that coming off is stoppable.

This configuration can prevent the tensioner main body from dropping out of the casing, when the tensioner main body is attached to the casing, or when the column housing to which the tensioner main body is attached is placed in the bracket.

Moreover, since a movement track of the tensioner main body is stabilized by the leg portion and the groove portion, a press function by the tensioner main body can be certainly exerted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering device comprising:
a column housing encapsulating a steering shaft related to steering of a vehicle, being supported by a pivotal support portion of the vehicle, and enabling a posture change;
a bracket being located adjacent to the column housing at a position different from that of the pivotal support portion on a side of the vehicle; and
a tensioner mechanism that is provided between the column housing and the bracket, and produces press force against the column housing and the bracket, wherein
the tensioner mechanism includes
a casing being provided in the column housing or the bracket,
a tensioner main body being provided in the casing, and being movable in a direction intersecting a facing direction of the column housing and the bracket, and
a biasing member biasing the tensioner main body in the intersecting direction,
the tensioner main body has a wedge shape including a first surface facing toward the column housing, and a second surface facing toward the bracket, and the first surface and the second surface are configured to be in a tapered shape in which a space therebetween is narrower as being positioned closer to a lower side of a biasing direction by the biasing member, and
the casing includes an intermediate member that is pressed in the opposite direction by abutment with the first surface or the second surface, and abuts on the bracket or the column housing on a side where the casing is not provided.

2. The steering device according to claim 1, wherein the intermediate member is provided with a coming-off stopper portion including a bulging portion at a tip and having an elastically deformable convex shape, and the casing is provided with a fixing bore into which the coming-off stopper portion is engaged.

3. The steering device according to claim 1, wherein a lock portion and a locked portion that engage with each other in a state where the tensioner main body is moved in a direction opposite to the biasing direction are allocated to and formed in the tensioner main body and the casing.

4. The steering device according to claim 3, wherein the tensioner main body includes a rod-shaped portion extending in the biasing direction, and the lock portion is a claw portion provided at a tip of the rod-shaped portion in a state of being elastically deformable in a direction orthogonal to the biasing direction, and
the locked portion is a bore portion being provided in the casing, including a concave portion to which the claw portion is lockable, and enabling receiving a tip of the rod-shaped portion.

5. The steering device according to claim 1, wherein a leg portion protruding in a direction orthogonal to the biasing direction, and a flange portion provided at a tip of the leg portion are formed in the tensioner main body, and the casing is provided with a groove portion that guides movements of the leg portion and the flange portion in such a way that coming off is stoppable.

* * * * *